United States Patent
Miller et al.

(10) Patent No.: US 8,847,896 B2
(45) Date of Patent: Sep. 30, 2014

(54) ADAPTIVE HIGH DYNAMIC RANGE SURFACE CAPACITIVE TOUCHSCREEN CONTROLLER

(75) Inventors: Mark E. Miller, Mission Viejo, CA (US); George C. Sneed, Irvine, CA (US); Ramakrishna Y. Vadapalli, Hyderabad (IN); Sudhaker Anumula, San Diego, CA (US)

(73) Assignee: Conexant Systems, Inc., Irvine, CA (US)

( * ) Notice: Subject to any disclaimer, the term of this patent is extended or adjusted under 35 U.S.C. 154(b) by 988 days.

(21) Appl. No.: 12/878,796

(22) Filed: Sep. 9, 2010

(65) Prior Publication Data

US 2012/0062500 A1    Mar. 15, 2012

(51) Int. Cl.
*G06F 3/041* (2006.01)
*G06F 3/044* (2006.01)

(52) U.S. Cl.
CPC .............. *G06F 3/044* (2013.01); *G06F 3/0416* (2013.01)
USPC ........................................ 345/173; 178/18.01

(58) Field of Classification Search
USPC .......... 345/173–179; 178/18.01–18.11, 19.01
See application file for complete search history.

(56) References Cited

U.S. PATENT DOCUMENTS

| 7,075,522 | B2 | 7/2006 | Han | |
| 8,159,462 | B1 * | 4/2012 | Seguine | 345/173 |
| 2007/0074913 | A1 | 4/2007 | Geaghan et al. | |
| 2009/0267914 | A1 * | 10/2009 | Dews et al. | 345/173 |

FOREIGN PATENT DOCUMENTS

| GB | 2443056 A | 4/2008 |
| WO | 2008157245 A2 | 12/2008 |

OTHER PUBLICATIONS

The International Bureau of WIPO; International Preliminary Report on Patentability; PCT Application No. PCT/US2011/050878; Mar. 21, 2013.
European Patent Office; International Search Report and Written Opinion; PCT Application No. PCT/US2011/050878; Nov. 4, 2011.

* cited by examiner

*Primary Examiner* — Kent Chang
*Assistant Examiner* — Scott Au
(74) *Attorney, Agent, or Firm* — Farjami & Farjami LLP

(57) ABSTRACT

A system for controlling a touch screen. A touch screen element having a plurality of contacts, such as one contact electrode at each of four corners. A multiplexer coupled to the touch screen element for forming a plurality of connections, such as various combinations of the contact electrodes to allow measurements to be made of the impedance of the touch screen element from the left side to the right side, from the top to the bottom, and do forth. A touch screen processor coupled to the touch screen element for determining an oscillation frequency of the touch screen element as a function of the electrode connections.

12 Claims, 10 Drawing Sheets

US 8,847,896 B2

ADAPTIVE HIGH DYNAMIC RANGE SURFACE CAPACITIVE TOUCHSCREEN CONTROLLER

FIELD OF THE INVENTION

The invention relates to touch screen controllers, and more particularly to a method and system for an adaptive high dynamic range surface capacitive touch screen controller with DC offset control.

BACKGROUND OF THE INVENTION

Surface capacitive touch screen controllers determine the location where a screen has been touched between the left and right sides and top and bottom of a touch screen element. Time-varying signals are fed into the corners of the touch screen element, and digital analysis of the waveforms and signals is used to determine the location at which the screen has been touched. These prior art methods are complex and result in incorrect data.

SUMMARY OF THE INVENTION

A system for controlling a touch screen is provided. The system includes a touch screen element having a plurality of contacts, such as one contact electrode at each of four corners. A multiplexer is coupled to the touch screen element for forming a plurality of connections, such as various combinations of the contact electrodes to allow measurements to be made of the impedance of the touch screen element from the left side to the right side, from the top to the bottom, and so forth. A touch screen processor is coupled to the touch screen element for determining an oscillation frequency of the touch screen element as a function of the electrode connections and the point at which the touch screen has been touched.

DETAILED DESCRIPTION OF PREFERRED EMBODIMENTS

Figure 1:
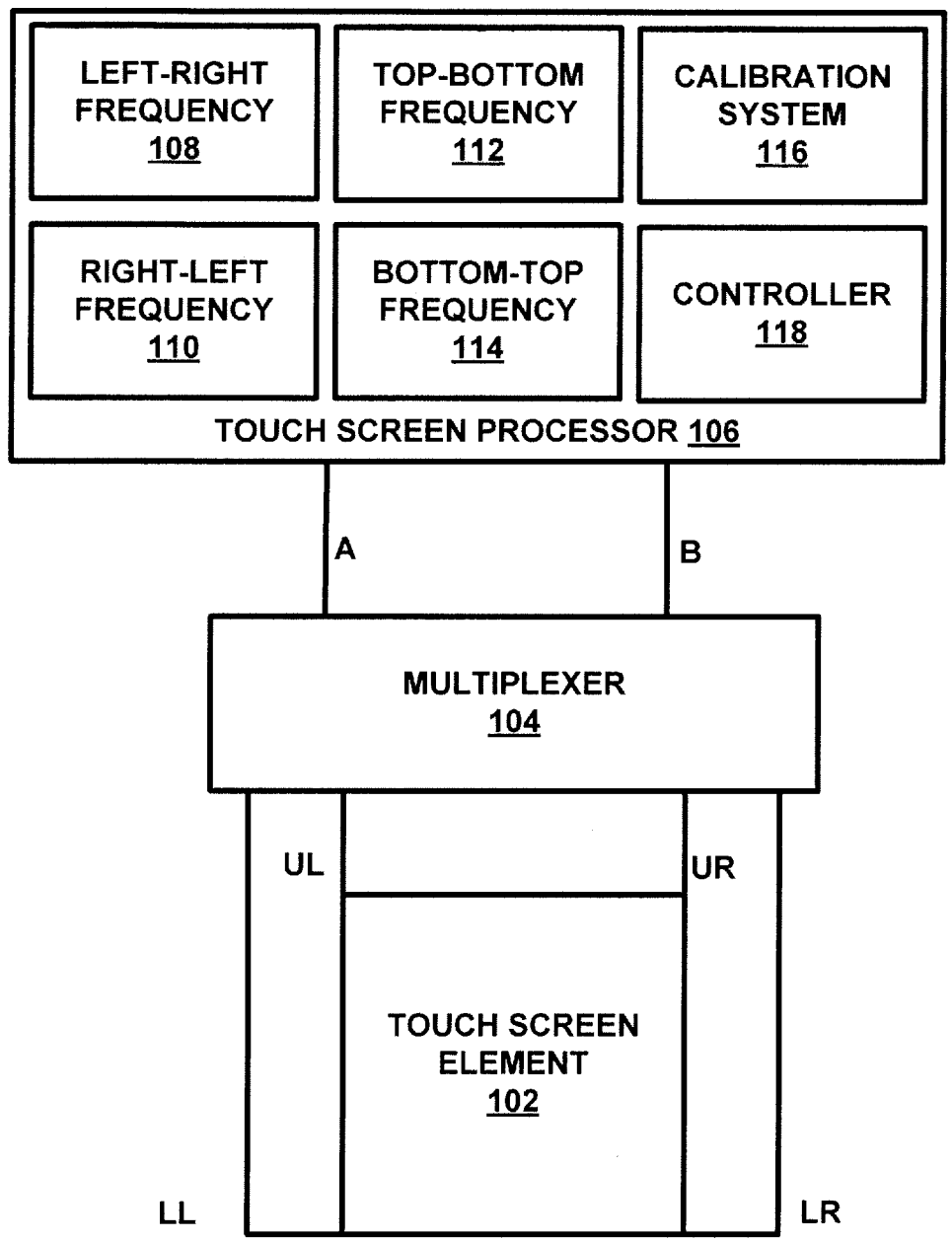
FIG. 1 is a diagram of a system for determining a location where a surface capacitive touch screen has been touched in accordance with an exemplary embodiment of the present invention.

In the description that follows, like parts are marked throughout the specification and drawings with the same reference numerals, respectively. The drawing figures might not be to scale and certain components can be shown in generalized or schematic form and identified by commercial designations in the interest of clarity and conciseness.

FIG. 1 is a diagram of a system 100 for determining a location where a surface capacitive touch screen has been touched in accordance with an exemplary embodiment of the present invention. System 100 utilizes a novel method for determining the location at which a surface capacitive touch screen element has been touched by using frequency measurement.

System 100 includes touch screen element 102, which can be a surface capacitive touch screen element that includes display elements and other conventional features of surface capacitive touch screen elements, or other suitable touch screen elements. Touch screen element 102 includes lower left (LL) terminal, lower right (LR) terminal, upper left (UL) terminal, and upper right (UR) terminal, which are coupled to multiplexer 104. Multiplexer 104 can couple suitable combinations of touch screen element 102 terminals to allow an oscillation frequency of a signal applied to the terminals to be determined. In one exemplary embodiment, multiplexer 104 can couple the upper left (UL) and upper right (UR) terminals of touch screen element 102 to input A of multiplexer 104, and can couple the lower left (LL) and lower right (LR) terminals of touch screen element 102 to output B of multiplexer 104, so as to allow the oscillation frequency of a signal applied to the upper terminals through the lower terminals of touch screen element 102 from input A to output B to be determined. In another exemplary embodiment, multiplexer 104 can couple the upper left (UL) and upper right (UR) terminals of touch screen element 102 to output B of multiplexer 104, and can couple the lower left (LL) and lower right (LR) terminals of touch screen element 102 to input A of multiplexer 104, so as to allow the oscillation frequency of a signal applied to the lower terminals through the upper terminals of touch screen element 102 from input A to output B to be determined.

In another exemplary embodiment, multiplexer 104 can couple the lower right (LR) and upper right (UR) terminals of touch screen element 102 to input A of multiplexer 104, and can couple the lower left (LL) and upper left (UL) terminals of touch screen element 102 to output B of multiplexer 104, so as to allow the oscillation frequency of a signal applied from the right terminals to the left terminals of touch screen element 102 from input A to output B to be determined. In another exemplary embodiment, multiplexer 104 can couple the upper left (UL) and upper right (UR) terminals of touch screen element 102 to input A of multiplexer 104, and can couple the lower left (LL) and lower right (LR) terminals of touch screen element 102 to output B of multiplexer 104, so as to allow the oscillation frequency of a signal applied to the upper terminals through the lower terminals of touch screen element 102 from input A through output B to be determined.

Other suitable combinations of input out output terminals and other suitable frequencies or circuit component values can also or alternatively be used.

Touch screen processor 106 is coupled to multiplexer 104 to allow it to process signals using touch screen element 102 to determine the resistive-capacitive oscillation frequency of touch screen element 102 as a function of where touch screen element 102 has been touched by a user. Touch screen processor 106 can be implemented in hardware or a suitable combination of hardware and software, and can be one or more software systems operating on a processing platform. As used herein and by way of example and not by limitation, "hardware" can include a combination of discrete components, an integrated circuit, an application-specific integrated circuit, a field programmable gate array, a digital signal processor, or other suitable hardware. As used herein and by way of example and not by limitation, "software" can include one or more objects, agents, threads, lines of code, subroutines, separate software applications, one or more lines of code or other suitable software structures operating in one or more software applications or on one or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

Touch screen processor 106 allows the oscillation frequency of a signal applied to input A of multiplexer 104 and measured at output B of multiplexer 104 to be determined. In one exemplary embodiment, surface capacitive touch screen element 102 will form a series/parallel resistive-capacitive element depending on where the touch screen element 102 is touched by a user, and other characteristics such as the resistance and capacitance to ground of the user, the relative humidity, the temperature, and other variables. The value of the series/parallel resistive-capacitive element will also depend on which terminals of touch screen element 102 are coupled together and how the signal is driven through touch screen element 102. In general, when touch screen element 102 is not being touched and the signal is applied from the left terminals to the right terminals, the oscillation frequency of touch screen element 102 will be at a minimum. When a user touches the left-most side of touch screen element 102, the oscillation frequency will increase by a relatively small amount, but as the user moves the point of contact from the left-most side towards the right-most side, the oscillation frequency will increase in a generally linearly manner to a maximum when the point of contact reaches the right-most side.

In a similar manner, the oscillation frequency of a signal measured from right to left, top to bottom, and bottom to top will also start at a minimum and increase as the point of contact moves from the near side of the circuit to the far side of the circuit. Using this phenomenon, it is possible to determine a point of contact or possibly multiple points of contact on a touch screen element 102 by making several measurements between top, bottom, left and right terminals of touch screen element 102.

Touch screen processor 106 includes left-right frequency processor 108 (for measuring a frequency associated with a signal applied to the left side and measured at the right side), right-left frequency processor 110 (for measuring a frequency associated with a signal applied to the right side and measured at the left side), top-bottom frequency processor 112 (for measuring a frequency associated with a signal applied to the top side and measured at the bottom side) and bottom-top frequency processor 114 (for measuring a frequency associated with a signal applied to the bottom side and measured at the top side), all of which are used to determine the location at which touch screen element 102 has been touched based on the frequency measured by the associated multiplexed combination of touch screen element 102 contacts as described above. Calibration system 116 is used to generate an indication for a user to touch to allow the circuit-specific variations in the capacitance and resistance of touch screen element 102 to be determined and compensated for, and also calibrates for circuit variations within the controller/processor. Controller 118 is described in further detail below, and is used to determine the frequency variation as a function of multiplexer configurations and point of contact with touch screen element 102.

In operation, system 100 allows a capacitive touch screen element to be operated in a manner to allow the location at which the touch screen element has been touched to be determined without complex signal processing and by using simple frequency measurements.

Figure 2:
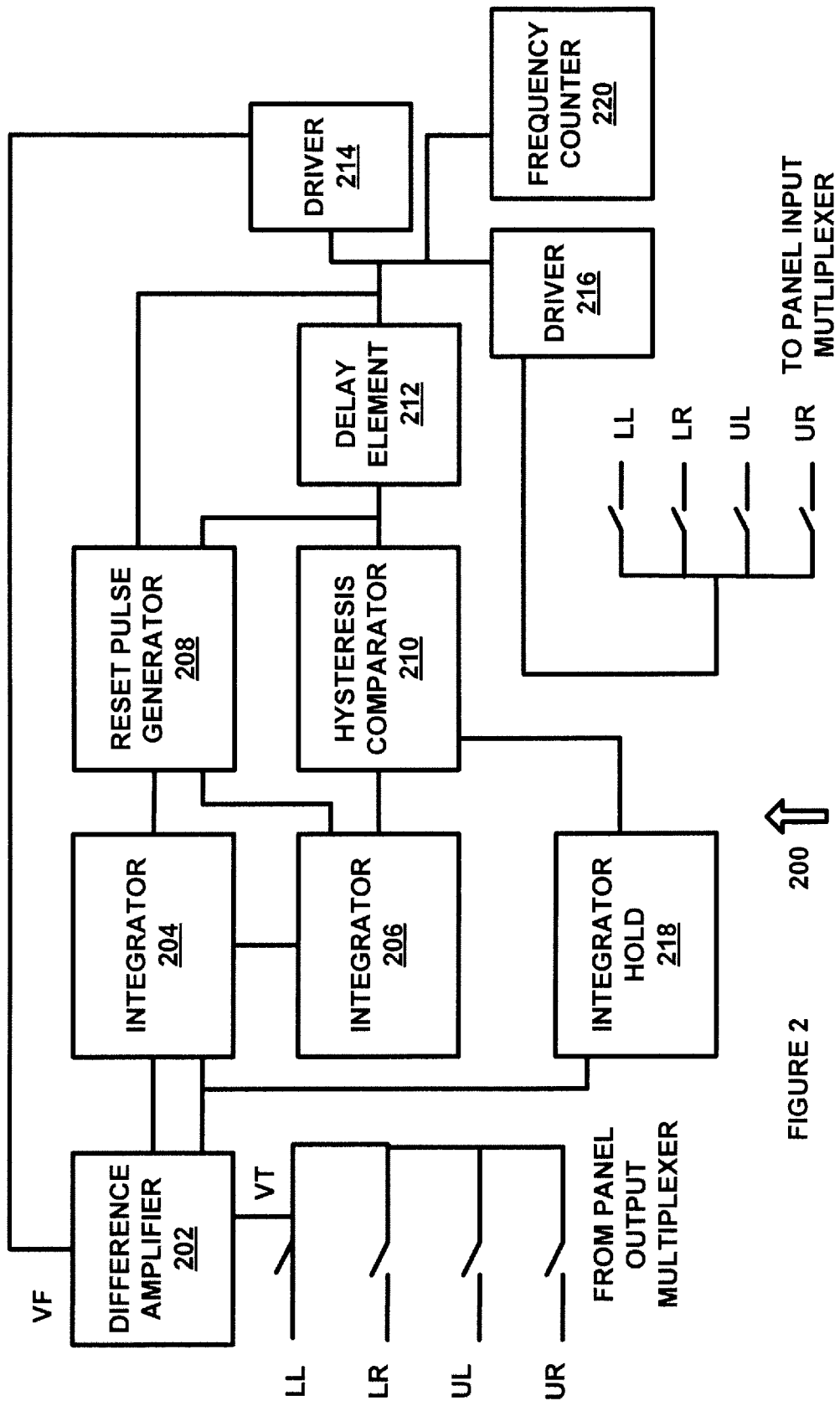
FIG. 2 is a diagram of a system for a surface capacitive touch screen controller in accordance with an exemplary embodiment of the present invention.

FIG. 2 is a diagram of a system 200 for a surface capacitive touch screen controller in accordance with an exemplary embodiment of the present invention. System 200 can be implemented in hardware or a suitable combination of hardware and software.

System 200 includes contacts LL (lower left), LR (lower right), UL (upper left) and UR (upper right) from the touch screen panel, and contacts LL, LR, UL and UR to the touch screen panel. These switches are configured so as to measure left-right or top-bottom touch locations, such as using a multiplexer as previously described. For example, shorting the LL and LR contacts from the touch screen panel and the UL and UR contacts to the touch screen panel allows the location between the top and bottom at which the touch screen panel is being touched to be determined from the series-parallel resistive/capacitive characteristics of the touch screen element, such as by measuring the frequency variation of a signal driven by the controller from the top to the bottom and from the bottom to the top. Likewise, shorting the LL and UL contacts from the touch screen panel and the LR and UR contacts to the touch screen panel allows the location between the left and right sides of the touch screen panel at which the touch screen panel is being touched to be determined, such as by using the controller to drive a signal from the left to the right and from the right to the left, as previously described. As previously described, the frequency differences between the different paths provide the basis for determining the location at which the touch screen panel has been touched.

Driver 216 provides a drive signal to the surface capacitive touch screen panel contact multiplexer, which connects the terminals of the surface capacitive touch screen element in a manner to provide a series/parallel resistive-capacitive load that causes system 200 to oscillate at a frequency that is a function of the location at which the surface capacitive touch screen has been touched. Driver 214 provides a feedback voltage (VF) that is used to compare with the voltage measured at the panel output multiplexer terminals (VT), and frequency counter 220 counts the oscillation frequency, which is provided as an input to touch screen processor 106 (not explicitly shown).

Difference amplifier 202 receives a voltage signal from the output terminals of the touch screen (VT) and a feedback voltage (VF) representing the input voltage applied to the input of the touch screen and generates a difference signal. The difference signal is integrated using integrator 204, which generally outputs a square wave signal that is integrated using integrator 206, which generally outputs a saw tooth signal. The output of integrator 206 drives hysteresis comparator 210, which controls reset pulse generator 208 based on the setting at which hysteresis occurs. The output of hysteresis comparator 210 resets integrators 204 and 206 through reset pulse generator 208.

In addition, integrator hold 218 can be provided to switch integrator 204 off during the period where no effective difference signal is being generated between the input and output signals, to remove a DC offset component that may be present due to mismatch between VF and VT that would be present during all times, namely, when the difference signal is present and when the difference signal is not present because VF and VT have essentially reached equilibrium. A loss of dynamic range may occur due to integration of the DC offset present during the signal response period (i.e. when VF is different from VT), but that loss would be less compared to the loss of accuracy from integrating a DC signal component during the period which there is essentially no signal response or difference between VF and VT, because the signal response period is approximately 300 nanoseconds in length, whereas the period during which there is no signal response is about 6 microseconds in length, a difference of greater than one order of magnitude. This alternative solution is targeted to cancel the DC offset during the time when there is no signal response. Another exemplary alternative to the integrator hold process is to run the panel driver at a higher frequency, although a high frequency could increase electromagnetic interference.

To implement this alternative configuration, an inverse hysteresis comparator can be used in integrator hold 218 as a low power solution to determine when the difference between VT and VF settles close to a predetermined amount, such as between 5 mV to 10 mV, and the inverse hysteresis comparator changes the output state at the time when the response from the surface capacitor element ends for a positive and negative edge input. At this time, the input to integrator 204 is disconnected from the output of difference amplifier 202, to prevent voltage droop during idle time. The inverse hysteresis comparator is described in further detail below.

When an inverse hysteresis buffer mechanism is not utilized, then a single XOR gate between hysteresis comparator 210 and delay element 212 can be used. If an inverse hysteresis buffer is used, then an additional XOR gate can be utilized between the inverse hysteresis buffer and a switch that is located between difference amplifier 202 and integrator 204 (not explicitly shown). An XOR gate in series with hysteresis comparator 210 and delay element 212 can also be used as a startup circuit for the surface capacitor element frequency measuring solution to ensure that an initial pulse is propagated into the filter chain at the time the closed loop condition is established. This startup process is achieved by applying a high logic pulse to the XOR gate, which acts as an inverter to cause the oscillator loop to become positive, such that system 200 does not oscillate. When the input to the XOR gate goes from logic high to low, a positive edge is fed to the surface capacitive touch screen panel after a predetermined delay. The delay element and XOR2 gate in 208 create an integrator reset pulse at each point in time where the output driven to the panel changes state (high to low or low to high), but the integrator reset pulse is not a contributing factor in the startup mechanism but rather is used every time the panel driver switches state, even after startup, and by the time the output response from the surface capacitive touch screen panel reaches difference amplifier 202, oscillation is setup in negative feedback mode as the "startup" signal is low, and system 200 starts to oscillate.

In operation, system 200 provides a driver circuit for driving a surface capacitive touch screen panel from left to right, right to left, top to bottom and bottom to top, so as to generate an oscillation frequency as a function of the series/parallel resistive-capacitive circuit characteristics of the surface capacitive touch screen panel. In this manner, the touch location can be determined based on a simple frequency measurement instead of using more complex prior art methods.

Figure 3:
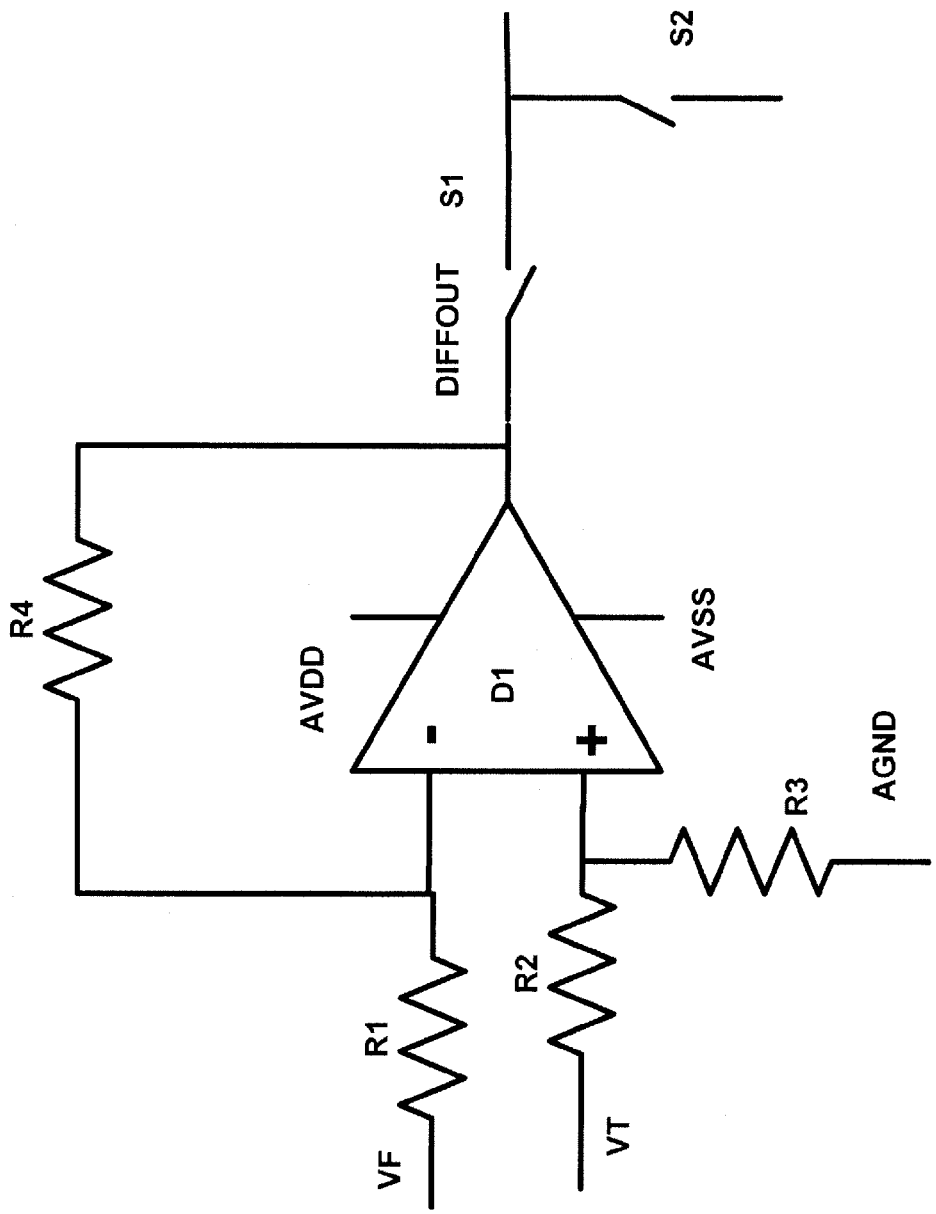
FIG. 3 is a diagram of a system utilizing a difference amplifier in accordance with an exemplary embodiment of the present invention.

FIG. 3 is a diagram of a system 300 utilizing an operational amplifier D1 in accordance with an exemplary embodiment of the present invention. Operational amplifier D1 receives power from sources AVDD and AVSS, and receives an input of VT at a positive input across resistance R2, with an additional resistance R3 to ground. Likewise, input VF is received through resistance R1. A coupling resistance R4 can be provided where suitable. Switches S1 and S2 can be used in some exemplary embodiments to disconnect the output of D1 from the following stage, such as integrator 204.

In operation, system 300 provides an exemplary difference amplifier for use in a surface capacitive touch screen driver in accordance with novel features of the present invention.

Figure 4:
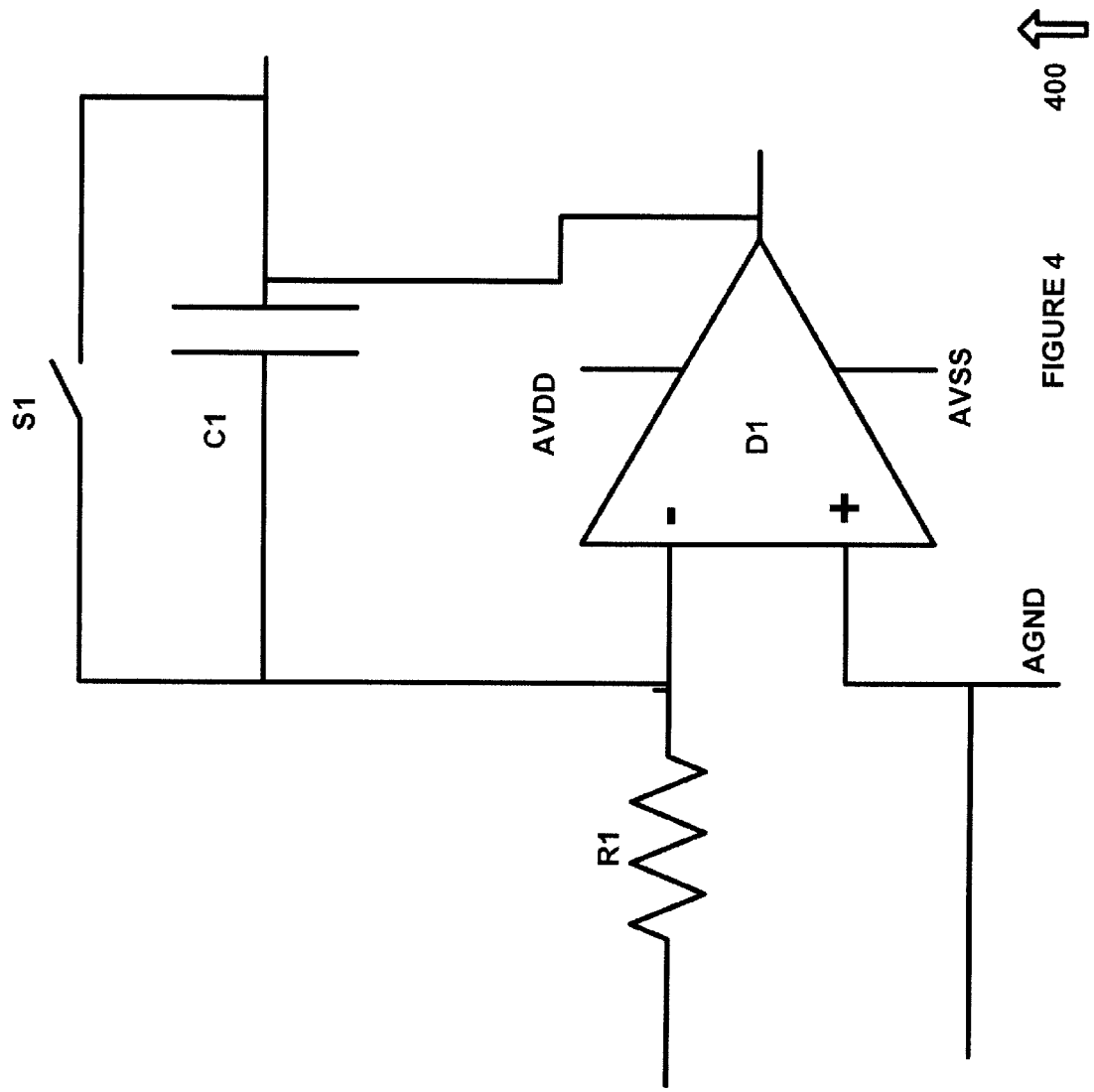
FIG. 4 is a diagram of a system of an integrator in accordance with an exemplary embodiment of the present invention.

FIG. 4 is a diagram of a system 400 of an integrator in accordance with an exemplary embodiment of the present invention. System 400 can be used as integrator 204, and includes operational amplifier D1; which receives power from sources AVDD and AVSS, a positive input tied to ground AGND, and a negative input from a prior stage such as difference amplifier 202 across resistor R1. Integrating capacitor C1 is used to allow operational amplifier D1 to act as a first order integrator, and switch S1 is used to reset the integration mode of system 400.

System 400 can also or alternatively be used as a second integrating stage such as integrator 206, where the input received at the negative input from a prior stage is received from integrator 204.

Figure 5:
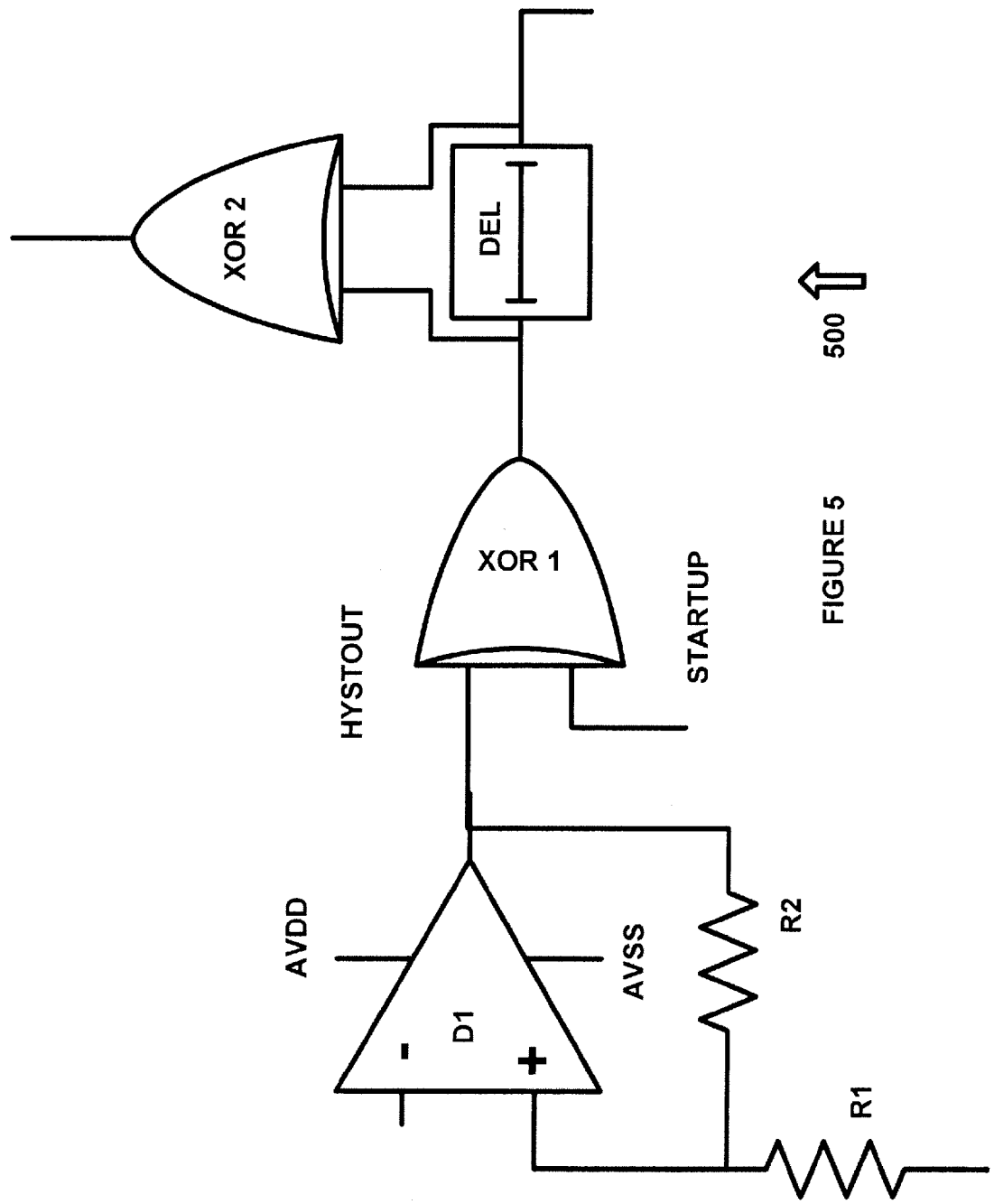
FIG. 5 is a diagram of a system for a hysteresis comparator including start-up and integrator reset functions in accordance with an exemplary embodiment of the present invention.

FIG. 5 is a diagram of a system 500 for a hysteresis comparator including start-up and integrator reset functions in accordance with an exemplary embodiment of the present invention. System 500 is shown with an exemplary XOR1 gate that can be used to provide a startup function, rather than the integrator hold function. While XOR1 might not be optional, it might not be absolutely needed. The output of XOR1 can be used as an input to the integrator hold function of system 600, but where XOR1 is not implemented, such as where there is no startup function, then the output of the hysteresis comparator or other suitable functionality can be used instead.

The hysteresis comparator operational amplifier D1 receives an input from a previous stage, such as integrator 206, which can output a ramp signal based on the input from integrator 204 or other suitable signals. The output of operational amplifier D1 is cascaded through delay element DEL whose input and output are fed to XOR2 to generate a reset pulse for the integrators. The output of delay element DEL is also provided to inverting buffers, one of which drives the panel through output multiplexer, another of which drives the feedback input of difference amplifier 202, and another of which is used to drive frequency counter 220. When system 500 is configured as an inverse hysteresis comparator with XOR1, a startup signal is also provided as described above.

Figure 6:
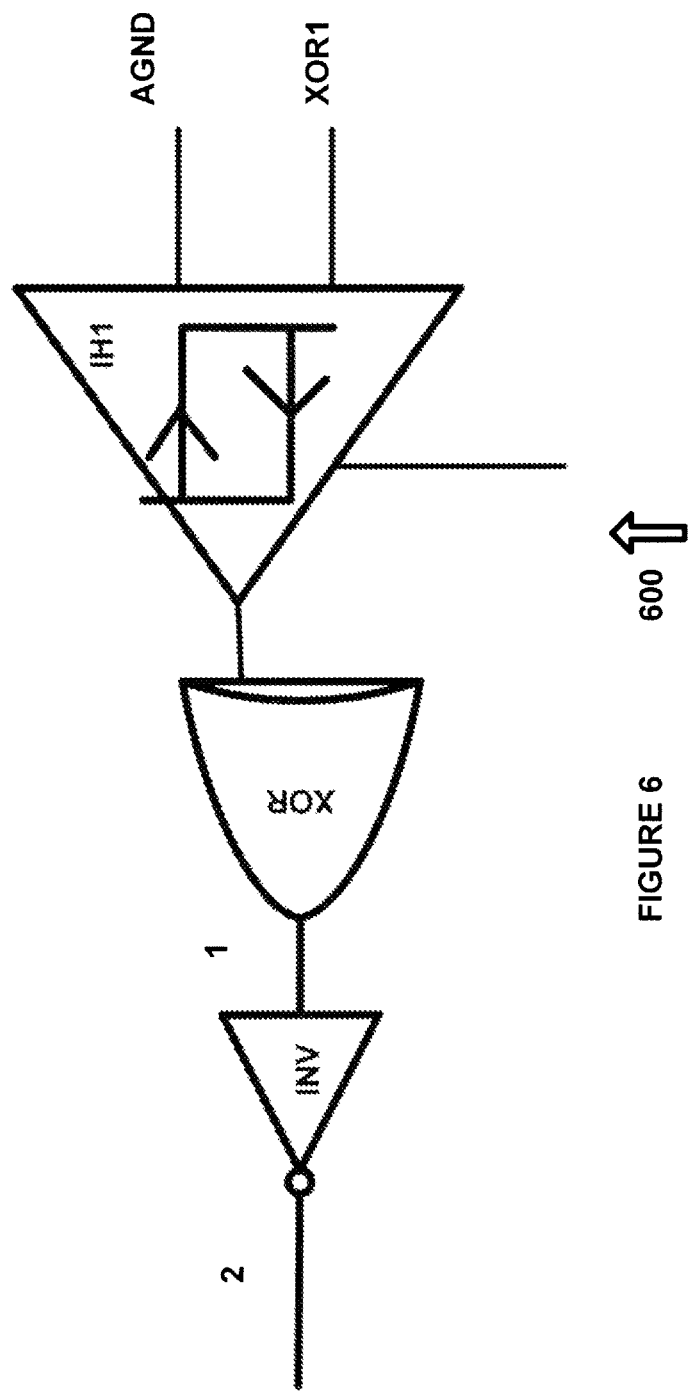
FIG. 6 is a diagram of a system for providing an integrator hold function in accordance with an exemplary embodiment of the present invention.

FIG. 6 is a diagram of a system 600 for providing integrator hold function control signals in accordance with an exemplary embodiment of the present invention. System 600 includes inverse hysteresis circuit IH1, which receives ground signal AGND and the output from XOR1 of hysteresis comparator 210 where a hysteresis function is provided. The output of inverse hysteresis circuit IH1 drives XOR to generate switch control signal 1 and inverter INV to generate switch control signal 2, such as for use with an integrator hold function, a DC offset correction, or other suitable functionality as further described herein.

In another exemplary embodiment, a time delay circuit can be used in place of inverse hysteresis circuit IH1, where the delay time is based on the approximate time that the differential signal is active, and where the integrator function is cut off once the differential signal goes to zero or essentially to zero. In this exemplary embodiment, the required time delay can be independent of the oscillation frequency. In this exemplary embodiment, the connection from system 500 would be from the output of the delay element in that system, rather than from the output of the XOR1 gate. The delay is approximately equal to the signal delay time through the driver 214 plus the panel plus the difference amplifier.

Figure 7:
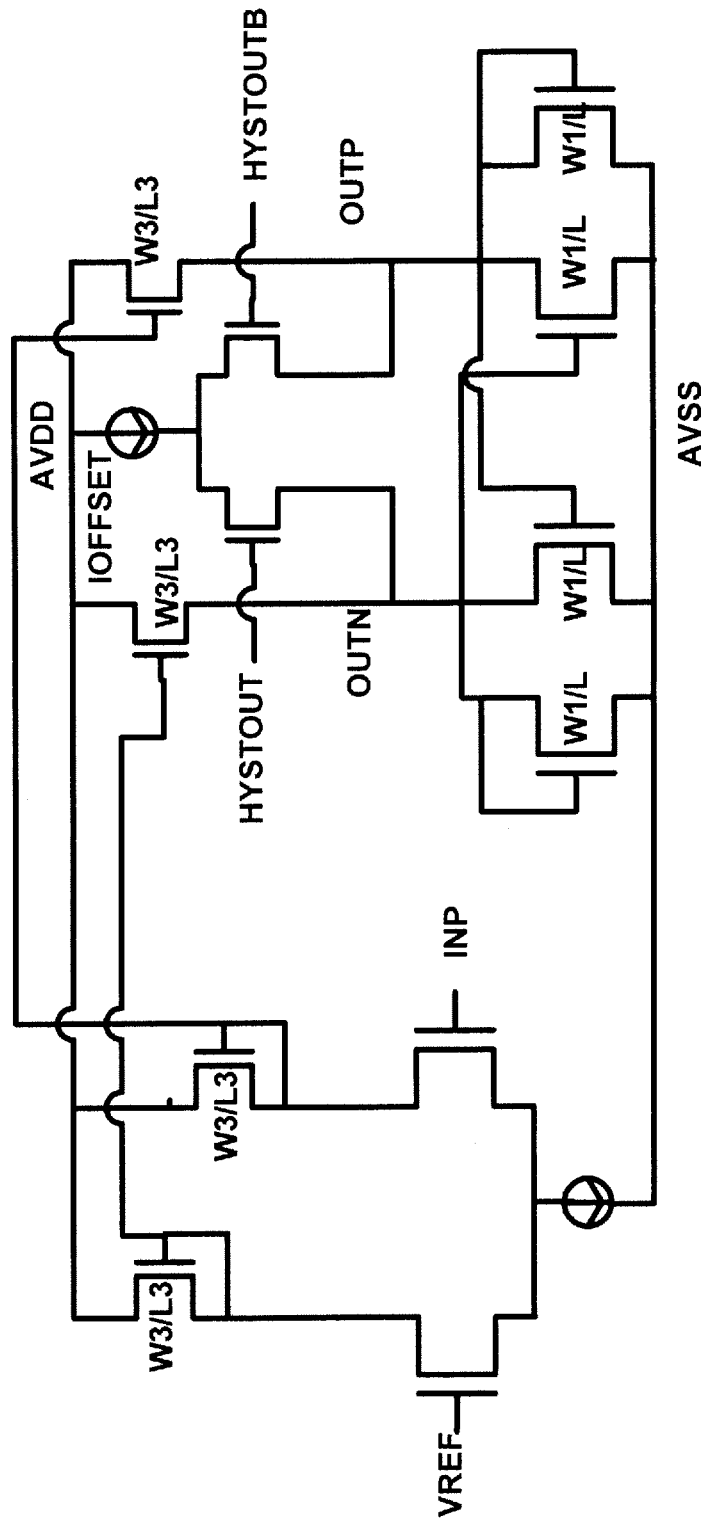
FIG. 7 is a diagram of a system for a hysteresis or inverse hysteresis comparator in accordance with an exemplary embodiment of the present invention.

FIG. 7 is a diagram of a system 700 for a hysteresis or inverse hysteresis comparator in accordance with an exemplary embodiment of the present invention. System 700 includes a conventional implementation of a hysteresis comparator where hysteresis is achieved by sizing the two load transistors differently in the positive feedback decision circuit. To achieve inverse hysteresis operation, an offset current source is applied to the decision circuit load depending on the edge that has been applied to the surface capacitive touch screen panel (hystout and hystoutb). In this exemplary embodiment, the load transistors have the same size. The same current source can also be used, and can be switched through switches to keep the trip voltage symmetrical with respect to the reference voltage.

Figure 8:
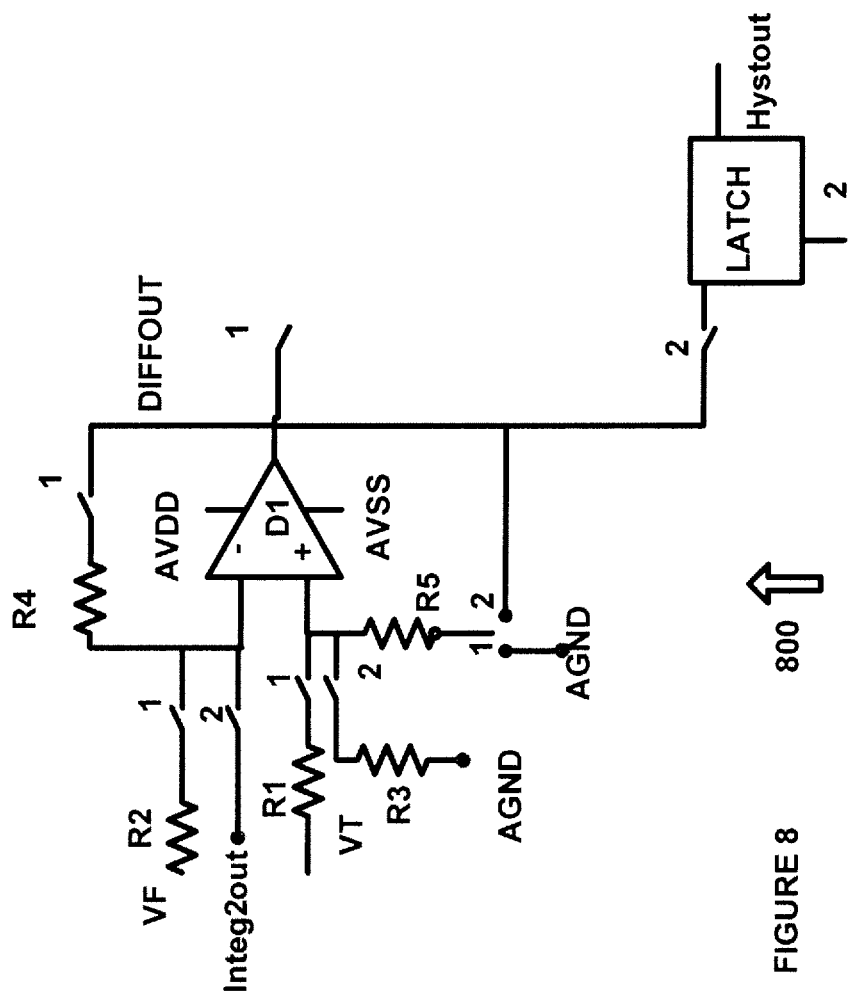
FIG. 8 is a diagram of a system for reducing the number of difference amplifiers required in a surface capacitive touch screen controller in accordance with an exemplary embodiment of the present invention.

FIG. 8 is a diagram of a system 800 for reducing the number of operational amplifiers required in a surface capacitive touch screen controller in accordance with an exemplary embodiment of the present invention. System 800 receives the hysteresis output Hystout from system 500 into the LATCH circuit, and the state of switch 1 and switch 2 from system 600 controls whether op amp D1 is used to drive the difference amplifier or the hysteresis comparator, which have duty cycles that allow a single op amp to be utilized. Nodes 1 and 2 control corresponding switches that reconfigure the resistive structure around op amp D1 to allow it to be utilized alternatively as a difference amplifier and hysteresis comparator. Nodes 1 and 2 also control the hold function at the input of the first integrator, and node 2 also controls the open/closed state of the LATCH circuit. Because the surface capacitive touch screen controller oscillates at frequencies close to 200 Khz, the refresh times are long enough to allow a single op amp to be used for the difference amplifier and the hysteresis comparator.

Figure 9:
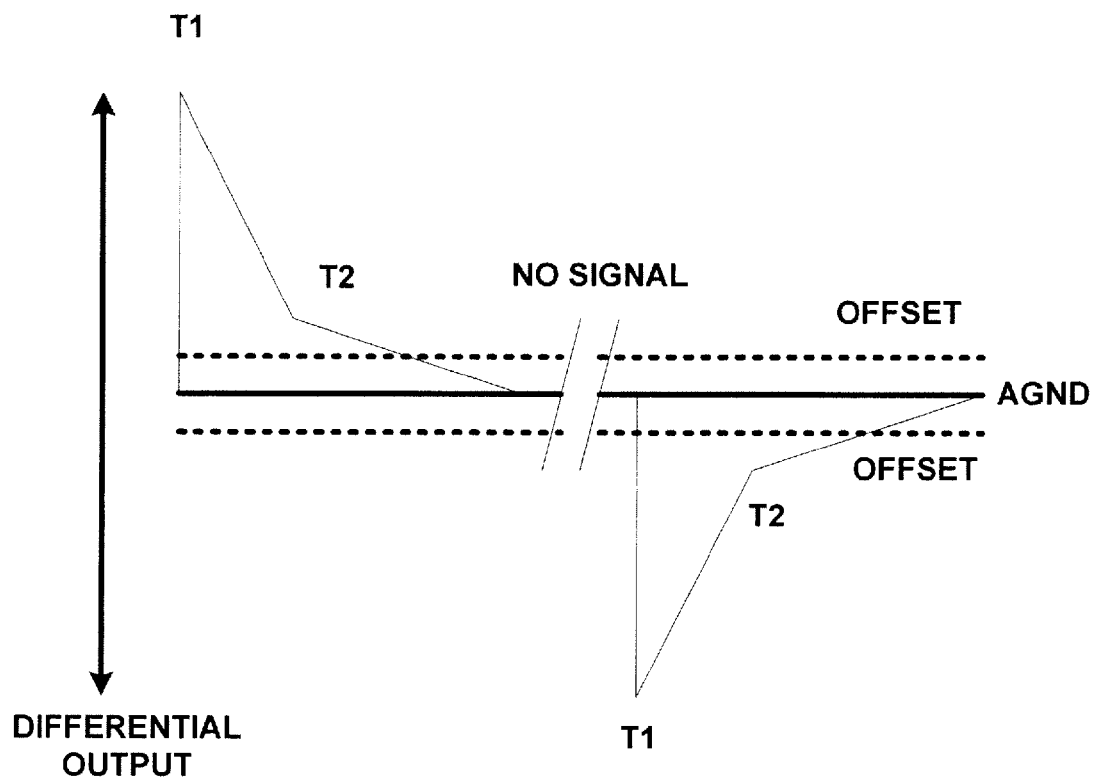
FIG. 9 is a diagram of a waveform showing attributes of a system for use in accordance with an exemplary embodiment of the present invention.

FIG. 9 is a diagram of a waveform 900 showing attributes of a system for use in accordance with an exemplary embodiment of the present invention. Waveform 900 includes times T1 and T2, which are the times at which the difference between 1) the signal applied to the input of the surface capacitive touch screen that is driven as described, and 2) the corresponding signal that is measured at the output of the driven surface capacitive touch screen, reach a maximum value and a first break point. In a surface capacitive touch screen element, applying a driver signal to the shorted left-right or top-bottom nodes can create an output that differs from the driver signal, where the difference signal characteristically includes the T1 and T2 breakpoint times, where T1 represents the time the signal is applied or removed, and T2 is a function of the location where the surface capacitive touch screen element has been touched.

As shown in waveform 900, DC offset values may exist due to variations in circuitry values. Integrating the waveforms over the periods where the differential output is essentially zero can create inaccurate position measurements. By using the disclosed embodiment of an inverse hysteresis comparator, or alternatively a time delay circuit, to dynamically determine the point at which the differential signal has essentially reached zero thereby compensating for any DC offset, a more accurate determination of the location at which the surface capacitive touch screen element has been touched can be obtained.

Figure 10:
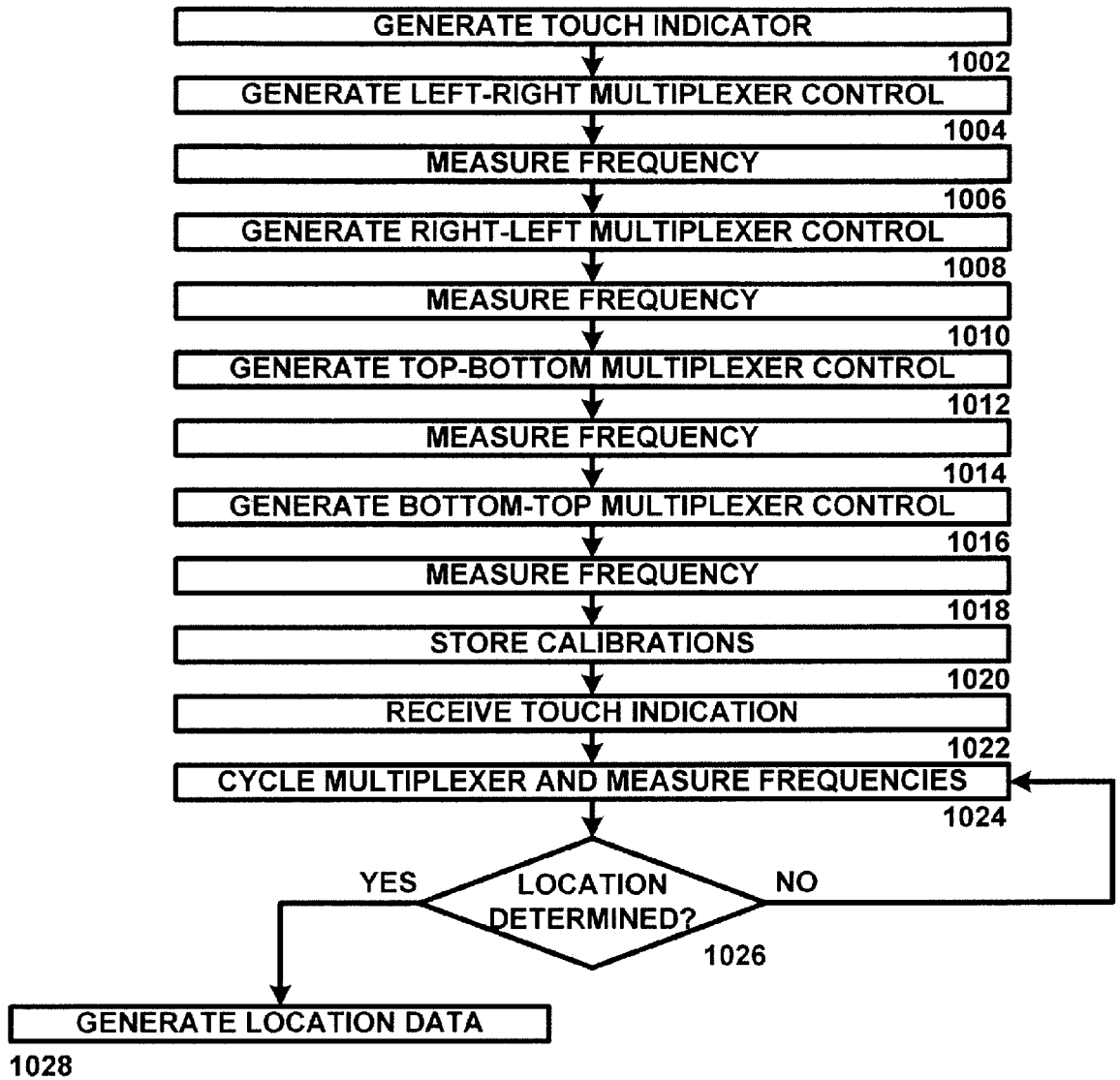
FIG. 10 is a diagram of an algorithm for calibrating a touch screen element and determining a location at which a touch screen element has been touched in accordance with an exemplary embodiment of the present invention.

FIG. 10 is a diagram of an algorithm 1000 for calibrating a touch screen element and determining a location at which a touch screen element has been touched in accordance with an exemplary embodiment of the present invention. Algorithm 1000 can be used with a surface capacitive touch screen element having four corner electrodes at locations arbitrarily referred to as "top left," "top right," "bottom left" and "bottom right," or other suitable touch screen elements. Algorithm 1000 can be implemented in conjunction with a general purpose processor to create a special purpose processor, or can be implemented using hardware elements such as application-specific integrated circuits, field-programmable gate arrays, digital signal processors or other suitable hardware.

Algorithm 1000 begins at 1002, where a touch indicator is generated. In one exemplary embodiment, a touch indicator can be generated using a visual display that is oriented with the touch screen element, so as to allow the location of the visual display to be correlated with the location at which the touch screen element is touched. Likewise, multiple touch indicators can be generated, such as where the touch screen element is capable of generating signals that allow multiple touch locations to be discriminated. The algorithm then proceeds to 1004.

At 1004, a left-right multiplexer control is generated. In one exemplary embodiment, a multiplexer is used to couple the top left and bottom left electrodes of the touch screen element as a first connection and the top right and bottom right electrodes of the touch screen element as a second connection so as to form a circuit element from the touch screen element to which a signal can be input at the left side and measured as an output at the right side. Other suitable processes can also or alternatively be used. The algorithm them proceeds to 1006, where a frequency is measured. As previously discussed, a baseline oscillation frequency may exist when there is no contact with the touch screen element, and as contact is made at the left side and moved towards the right side, the frequency can change, such as by increasing or decreasing, based on the design of the touch screen element. The change can be linear or otherwise variable as a function of location. After the frequency has been measured, the algorithm proceeds to 1008.

At 1008, a right-left multiplexer control is generated. In one exemplary embodiment, a multiplexer is used to couple the top right and bottom right electrodes of the touch screen element as a first connection and the top left and bottom left electrodes of the touch screen element as a second connection so as to form a circuit element from the touch screen element to which a signal can be input at the right side and measured as an output at the left side. Other suitable processes can also or alternatively be used. The algorithm them proceeds to 1010, where a frequency is measured. As previously discussed, a baseline oscillation frequency may exist when there is no contact with the touch screen element, and as contact is made at the right side and moved towards the left side, the frequency can change, such as by increasing or decreasing, based on the design of the touch screen element. The change can be linear or otherwise variable as a function of location. After the frequency has been measured, the algorithm proceeds to 1012.

At 1012, a top-bottom multiplexer control is generated. In one exemplary embodiment, a multiplexer is used to couple the top left and top right electrodes of the touch screen element as a first connection and the bottom left and bottom right electrodes of the touch screen element as a second connection so as to form a circuit element from the touch screen element to which a signal can be input at the top side and measured as an output at the bottom side. Other suitable processes can also or alternatively be used. The algorithm them proceeds to 1014, where a frequency is measured. As previously discussed, a baseline oscillation frequency may exist when there is no contact with the touch screen element, and as contact is made at the top side and moved towards the bottom side, the frequency can change, such as by increasing or decreasing, based on the design of the touch screen element. The change can be linear or otherwise variable as a function of location. After the frequency has been measured, the algorithm proceeds to 1016.

At 1016, a bottom-top multiplexer control is generated. In one exemplary embodiment, a multiplexer is used to couple the bottom left and bottom right electrodes of the touch screen element as a first connection and the top left and top right electrodes of the touch screen element as a second connection so as to form a circuit element from the touch screen element to which a signal can be input at the bottom side and measured as an output at the top side. Other suitable processes can also or alternatively be used. The algorithm them proceeds to 1018, where a frequency is measured. As previously discussed, a baseline oscillation frequency may exist when there is no contact with the touch screen element, and as contact is made at the bottom side and moved towards the top side, the frequency can change, such as by increasing or decreasing, based on the design of the touch screen element. The change can be linear or otherwise variable as a function of location. After the frequency has been measured, the algorithm proceeds to 1020.

At 1020, the calibration frequencies are stored. In one exemplary embodiment, an error signal can be generated if calibration failed, such as if the measured frequencies did not correlate with the expected location, and the calibration process can be repeated. Likewise, the frequencies measured at the different algorithm steps can be compared with predetermined frequency variation models for the touch screen element, such as to verify that the location associated with the frequency measured at 1006 correlates with the location associated with the frequency measured at 1010, to verify that the location associated with the frequency measured at 1014 correlates with the location associated with the frequency measured at 1018, or for other suitable purposes, such as where multiple touch screen locations can be measured. The algorithm then proceeds to 1022.

At 1022, a touch indication is received. In one exemplary embodiment, 1022 can be separate in time from the calibration procedure, and can be performed after the touch screen element has been turned off, relocated, or otherwise separated from the calibration procedure. The touch indication can be received in response to a touch input detection control, such as after a display has been generated to which a user touch response is expected. Alternatively, the touch indication can be based on a change in frequency, impedance, or other electrical circuit changes. The algorithm then proceeds to 1024.

At 1024, the multiplexer and touch screen controller are cycled to measure the frequencies corresponding to the different combinations of touch screen element electrodes. The algorithm then proceeds to 1026, where it is determined whether a touch location has been determined. If a touch location has not been determined, such as if conflicting frequency measurements have been recorded, the algorithm returns to 1024, otherwise the algorithm proceeds to 1028 where location data is generated identifying where the touch screen element has been touched.

In operation, method 1000 allows a touch screen element to be operated in a novel manner so as to allow the touch screen element to be used to identify a location at which a user has touched the touch screen element in a simpler and more accurate manner that only requires measurement of frequencies, instead of the more complicated prior art processes.

While certain exemplary embodiments have been described in detail and shown in the accompanying drawings, it is to be understood that such embodiments are merely illustrative of and not restrictive on the broad invention. It will thus be recognized to those skilled in the art that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and the spirit of the invention defined by the appended claims.

What is claimed is:

1. A system for controlling a touch screen comprising: a touch screen element having a plurality of contacts;
   a multiplexer coupled to the touch screen element for forming a plurality of connections; and
   a touch screen processor coupled to the touch screen element and configured to determine an oscillation frequency of the touch screen element, the touch screen processor further comprising:
   a difference amplifier configured to receive a touch screen element input signal and a touch screen element output signal and to generating a difference signal;
   an integrator configured to receive a difference signal input and to generate an integrated difference signal output;
   a reset pulse generator coupled to the integrator and configured to reset the integrator;
   an integrator hold coupled to the integrator and configured to compensate the integrator noise signal; and
   a second integrator configured to receive the output of the integrator and to generating an input to a reset pulse generator.

2. The system of claim 1 wherein the touch screen processor comprises a left-right frequency system for determining a touch location associated with a circuit driving from a left hand side of the touch screen element to a right hand side of the touch screen element as a function of an oscillation frequency for a signal applied to the left hand side of the touch screen element and measured at the right hand side of the touch screen element.

3. The system of claim 1 wherein the touch screen processor comprises a right-left frequency system for determining a touch location associated with a circuit driven from a right hand side of the touch screen element to a left hand side of the touch screen element as a function of an oscillation frequency for a signal applied to the right hand side of the touch screen element and measured at the left hand side of the touch screen element.

4. The system of claim 1 wherein the touch screen processor comprises a top-bottom frequency system for determining a touch location associated with a circuit driven from a top side of the touch screen element to a bottom side of the touch screen element as a function of an oscillation frequency for a signal applied to the top side of the touch screen element and measured at the bottom side of the touch screen element.

5. The system of claim 1 wherein the touch screen processor comprises a bottom-top frequency system for determining a touch location associated with a circuit driven from a bottom of the touch screen element to a top of the touch screen element as a function of an oscillation frequency for a signal applied to the bottom of the touch screen element and measured at the top of the touch screen element.

6. The system of claim 1 wherein the touch screen processor comprises a calibration system for calibrating a frequency based on a location at which the touch screen element is being touched.

7. The system of claim 1 wherein the touch screen processor comprises a frequency counter for determining a frequency of oscillation of a circuit in which the touch screen element forms an oscillator element.

8. The system of claim 1 wherein the touch screen processor comprises a frequency counter for determining a frequency of oscillation of a circuit in which the touch screen element forms an oscillator element.

9. The system of claim 1 wherein the touch screen processor comprises a frequency counter for determining a frequency of oscillation of a circuit in which the touch screen element forms an oscillator element.

10. The system of claim 1 wherein the touch screen processor comprises a frequency counter for determining a frequency of oscillation of a circuit in which the touch screen element forms an oscillator element.

11. The system of claim 1 wherein the touch screen processor comprises a frequency counter for determining a frequency of oscillation of a circuit in which the touch screen element forms an oscillator element.

12. The system of claim 1 wherein the touch screen processor comprises a frequency counter for determining a frequency of oscillation of a circuit in which the touch screen element forms an oscillator element.

\* \* \* \* \*